US010163541B2

(12) United States Patent
Shigeta et al.

(10) Patent No.: US 10,163,541 B2
(45) Date of Patent: Dec. 25, 2018

(54) LATEX COMPOSITION, PRODUCTION METHOD THEREFOR, COMPOSITE MATERIAL, AND CONDUCTIVE FORMED PRODUCT

(71) Applicant: ZEON CORPORATION, Chiyoda-ku, Tokyo (JP)

(72) Inventors: Masahiro Shigeta, Tokyo (JP); Mitsugu Uejima, Tokyo (JP); The Ban Hoang, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/029,727

(22) PCT Filed: Oct. 23, 2014

(86) PCT No.: PCT/JP2014/005390
§ 371 (c)(1),
(2) Date: Apr. 15, 2016

(87) PCT Pub. No.: WO2015/059936
PCT Pub. Date: Apr. 30, 2015

(65) Prior Publication Data
US 2016/0240279 A1 Aug. 18, 2016

(30) Foreign Application Priority Data
Oct. 24, 2013 (JP) ................... 2013-220719

(51) Int. Cl.
| | |
|---|---|
| H01B 1/24 | (2006.01) |
| B82Y 30/00 | (2011.01) |
| C08L 21/02 | (2006.01) |
| H01B 1/04 | (2006.01) |
| C08J 3/215 | (2006.01) |
| C08K 7/24 | (2006.01) |
| C08K 3/04 | (2006.01) |
| C08L 9/04 | (2006.01) |

(52) U.S. Cl.
CPC .............. *H01B 1/24* (2013.01); *C08J 3/215* (2013.01); *C08K 3/041* (2017.05); *C08K 7/24* (2013.01); *C08L 9/04* (2013.01); *C08L 21/02* (2013.01); *H01B 1/04* (2013.01); *B82Y 30/00* (2013.01); *C08J 2309/04* (2013.01); *C08K 2201/001* (2013.01); *C08K 2201/003* (2013.01); *C08K 2201/011* (2013.01); *Y10S 977/742* (2013.01); *Y10S 977/932* (2013.01)

(58) Field of Classification Search
CPC . H01B 1/04; H01B 1/24; B82Y 40/00; B82Y 30/00; C01B 31/0273
USPC .............. 252/500–511; 423/445 R
See application file for complete search history.

(56) References Cited

U.S. PATENT DOCUMENTS

| | | | |
|---|---|---|---|
| 5,314,941 A | 5/1994 | Yamanaka et al. | |
| 5,484,844 A | 1/1996 | Oshima et al. | |
| 2008/0318049 A1 | 12/2008 | Hata et al. | |
| 2009/0297846 A1 | 12/2009 | Hata et al. | |
| 2010/0047690 A1* | 2/2010 | Tsuchiya .............. | H01M 4/621 429/217 |
| 2010/0160534 A1* | 6/2010 | Feldermann ........... | C08L 51/04 524/504 |
| 2010/0301278 A1* | 12/2010 | Hirai ...................... | B82Y 30/00 252/502 |
| 2012/0122020 A1* | 5/2012 | Hata ....................... | B82Y 30/00 429/532 |
| 2012/0321544 A1* | 12/2012 | Takai ..................... | B01J 23/745 423/447.3 |
| 2013/0004657 A1* | 1/2013 | Xu ......................... | B82Y 30/00 427/122 |
| 2014/0202744 A1 | 7/2014 | Kobayashi et al. | |
| 2014/0353556 A1 | 12/2014 | Shigeta et al. | |
| 2015/0329693 A1* | 11/2015 | Shigeta ................... | C08K 3/04 524/566 |

FOREIGN PATENT DOCUMENTS

| | | | | |
|---|---|---|---|---|
| EP | 1777262 A1 * | 4/2007 | ............ | C08L 55/02 |
| EP | 1787955 A1 | 5/2007 | | |
| EP | 2787044 A1 | 10/2014 | | |
| EP | 3053879 A1 | 8/2016 | | |
| JP | H04-339845 A | 11/1992 | | |
| JP | H06-25495 A | 2/1994 | | |
| JP | 2006-517996 A | 8/2006 | | |
| JP | 2007087881 A * | 4/2007 | ............ | H01M 10/05 |
| JP | 4621896 B2 | 1/2011 | | |
| JP | 4811712 B2 | 11/2011 | | |
| JP | 5263463 B1 | 8/2013 | | |

(Continued)

OTHER PUBLICATIONS

Xia ("Colymer/Carbon Nanotube Composite Emulsion Prepared Through Ultrasonically Assisted In Situ Emulsion Polymerization." J Appl Pol Sc, 100, pp. 3123-3130, 2006).*
Caneba ("Novel Ultrasonic Dispersion of Carbon Nanotubes. "Journal of Minerals & Materials Characterization & Engineering, vol. 9, No. 3, pp. 165-181, 2010).*
Inoue ("Synthesis of diameter-controlled carbon nanotubes using centrifugally classified nanoparticle catalysts." Carbon 45, pp. 2164-2170, 2007).*
Jiang ("Fabrication and Characterization of NBR/MWCNT Composites by Latex Technology." Polymer Composites, pp. 1587-1592, online Aug. 11, 2012).*

(Continued)

*Primary Examiner* — Tri V Nguyen
(74) *Attorney, Agent, or Firm* — Kenja IP Law PC

(57) ABSTRACT

Provided is a latex composition including a latex that includes a polymer having a tetrahydrofuran-insoluble component content of at least 1 mass % and no greater than 75 mass % and carbon nanotubes that have an average diameter (Av) and a diameter distribution (3σ) satisfying a relationship 0.60>3σ/Av>0.20. A composite material and a conductive formed product obtainable using the latex composition exhibit superior conductivity.

8 Claims, No Drawings

(56) References Cited

FOREIGN PATENT DOCUMENTS

| JP | 2013157086 A | 8/2013 | | |
|---|---|---|---|---|
| WO | 2004/072159 A1 | 8/2004 | | |
| WO | 2006/011655 A1 | 2/2006 | | |
| WO | WO2013/080912 A1 * | 6/2013 | ............. | C01B 31/02 |
| WO | WO-2013080912 A1 * | 6/2013 | ............. | B82Y 30/00 |
| WO | 2013146254 A1 | 10/2013 | | |

OTHER PUBLICATIONS

Feb. 3, 2015, Written Opinion of the International Searching Authority issued in the International Patent Application No. PCT/JP2014/005390, along with its English translation, and Comments responsive to the observation in the International Search Opinion Box No. VIII.

Evgeniy E Tkalya et al: "The use of surfactants for dispersing carbon nanotubes and graphene to make conductive nanocomposites", Current Opinion in Colloid and Interface Scienece, London, GB, vol. 17, No. 4, Mar. 8, 2012 (Mar. 8, 2012), pp. 225-232, XP028518161, ISSN: 1359-0294, DOI: 10.1016/J.COCIS.2012.03.001 [retrieved on Mar. 14, 2012].

Izabela Jurewicz et al: "Locking Carbon Nanotubes in Confined Lattice Geometries—A Route to Low Percolation in Conducting Composites", Journal of Physical Chemistry Part B: Condensed Matter, Materials, Surfaces, Interfaces & Biophysical, vol. 115, No. 20, May 26, 2011 (May 26, 2011), pp. 6395-6400, XP055302722, US ISSN: 1520-6106, DOI: 10.1021/jp111998p.

Kim et al. "Influence of polymer modulus on the percolation threshold of latex-based composites", Polymer, Elsevier Science Publishers B.V, GB, vol. 49, No. 2, Nov. 22, 2007 (Nov. 22, 2007), pp. 570-578, XP022422578, ISSN: 0032-3861, DOI: 10.1016/J.POLYMER.2007.11.035.

Sep. 26, 2016, the Extended European Search Report issued by the European Patent Office in the corresponding European Patent Application No. 14855834.9.

Wang T et al: "Design and fabrication of colloidal polymer nanocomposites", Advances in Colloid and Interface Science, Elsevier, NL, vol. 147-148, Mar. 1, 2009 (Mar. 1, 2009), pp. 319-332, XP025994914, ISSN: 0001-8686, DOI: 10.1016/J.CIS.2008.06.002 [retrieved on Jul. 6, 2008].

Kenji Hata et al, Water-Assisted Highly Efficient Synthesis of Impurity-Free Single-Walled Carbon Nanotubes, Science, Nov. 19, 2004, vol. 306, p. 1362-1364.

* cited by examiner

LATEX COMPOSITION, PRODUCTION METHOD THEREFOR, COMPOSITE MATERIAL, AND CONDUCTIVE FORMED PRODUCT

TECHNICAL FIELD

The present disclosure relates to a latex composition including a latex and carbon nanotubes, a production method for the latex composition, and a composite material and a conductive formed product that are obtained using the latex composition.

BACKGROUND

A conventional method has been proposed in which a carbon material, such as carbon black, is blended with a polymer, such as a resin, in order to obtain a composite material with desired conductivity. In recent years, there has been increased demand for composite materials with further improved functionality in order to meet the demand for various devices with higher performance. One method that has been proposed for imparting superior conductivity and mechanical properties on a composite material is a technique that involves blending carbon nanotubes instead of a conventional carbon material.

In one specific example, PTL 1 proposes a method in which carbon nanotubes are blended with a latex with the objective of improving mechanical properties and conductivity of a polymer.

On the other hand, various methods for synthesizing carbon nanotubes have been proposed in recent years (for example, refer to NPL 1) such as a method (hereinafter referred to as the "super growth method") in which a catalyst activating material such as water is brought into contact with a catalyst in accompaniment to a feedstock gas in the synthesis of carbon nanotubes by CVD in order to dramatically increase the activity and lifetime of the catalyst. Carbon nanotubes with various properties are produced through these methods.

CITATION LIST

Patent Literature

PTL 1: JP-A-2006-517996 (WO2004/072159)

Non-Patent Literature

NPL 1: Kenji Hata et al, Water-Assisted Highly Efficient Synthesis of Impurity-Free Single-Walled Carbon Nanotubes, SCIENCE, 2004.11.19, VOL. 306, p. 1362-1364

SUMMARY

Technical Problem

However, there is demand for improving properties, such as conductivity and mechanical properties, of composite materials having carbon nanotubes blended therein.

Solution to Problem

The present inventors conducted diligent investigation using carbon nanotubes and polymers having various properties with the objective of further improving properties (for example, conductivity and mechanical properties) of a composite material. The inventors newly discovered that conductivity of a composite material can be increased by using carbon nanotubes having prescribed properties and that the effect of improved composite material conductivity achieved using the carbon nanotubes having the prescribed properties varies significantly depending on the properties of a polymer with which the carbon nanotubes are combined. This discovery lead to the present disclosure.

Thus, the present disclosure provides a latex composition including a latex that includes a polymer having a tetrahydrofuran-insoluble component content of at least 1 mass % and no greater than 75 mass % and carbon nanotubes that have an average diameter (Av) and a diameter distribution ($3\sigma$) satisfying a relationship $0.60 > 3\sigma/Av > 0.20$.

In the latex composition, the carbon nanotubes preferably constitute no greater than 10 parts by mass per 100 parts by mass of the polymer. Moreover, the polymer is preferably a conjugated diene rubber.

The latex composition is obtainable by blending a dispersion liquid of carbon nanotubes having an average diameter (Av) and a diameter distribution ($3\sigma$) satisfying a relationship $0.60 > 3\sigma/Av > 0.20$ with a latex including a polymer having a tetrahydrofuran-insoluble component content of at least 1 mass % and no greater than 75 mass %.

The dispersion liquid of the carbon nanotubes is preferably obtained by dispersing carbon nanotubes having an average diameter (Av) and a diameter distribution ($3\sigma$) satisfying a relationship $0.60 > 3\sigma/Av > 0.20$ in a solvent through dispersion treatment that brings about a cavitation effect. Moreover, the dispersion treatment is preferably one or more dispersion treatments selected from the group consisting of dispersion treatment using ultrasound, dispersion treatment using a jet mill, and dispersion treatment using high-shear stirring.

The present disclosure also provides a carbon nanotube-containing composite material that is obtainable using the latex composition described above.

Moreover, the present disclosure provides a conductive formed product formable by forming the composite material.

Advantageous Effect

The present disclosure can provide a latex composition that is applicable for forming a composite material and a conductive formed product having superior properties, such as conductivity.

The present disclosure can also provide a composite material and a conductive formed product having superior properties, such as conductivity.

DETAILED DESCRIPTION

Embodiments of the disclosure will be specifically described below.

A presently disclosed latex composition includes a latex and carbon nanotubes and is suited for use as a raw material for producing a composite material and a conductive formed product having superior conductivity.

(Latex Composition)

The presently disclosed latex composition includes a latex that includes a polymer having a tetrahydrofuran-insoluble component content of at least 1 mass % and no greater than 75 mass % and carbon nanotubes that have an average diameter (Av) and a diameter distribution ($3\sigma$) satisfying a relationship $0.60 > 3\sigma/Av > 0.20$. As a result of the latex composition including the combination of the polymer having the prescribed tetrahydrofuran-insoluble component content and the carbon nanotubes having the average diameter (Av) and the diameter distribution (3σ) satisfying the prescribed relationship, the latex composition can be used to form a composite material and a conductive formed product having dramatically increased conductivity.

It should be noted that the latex composition may further include optional additives in addition to the latex and the carbon nanotubes.

<Latex>

The polymer included in the latex and having the tetrahydrofuran-insoluble component content of at least 1 mass % and no greater than 75 mass % may for example be a rubber such as a natural rubber or a synthetic rubber and no specific limitations are placed thereon other than the tetrahydrofuran-insoluble component content being within the range described above. Specific examples of rubbers that be used include natural rubber, conjugated diene rubber, butyl rubber, and urethane rubber.

Among these rubbers, a conjugated diene rubber is preferably used as the polymer.

The conjugated diene rubber is a homopolymer of a single type of conjugated diene monomer, a copolymer of two or more types of conjugated diene monomers, or a copolymer of a conjugated diene monomer and a monomer copolymerizable therewith.

Although no specific limitations are placed on the conjugated diene monomer, specific examples of conjugated diene monomers that can be used include 1,3-butadiene, isoprene, 2,3-dimethyl-1,3-butadiene, 2-ethyl-1,3-butadiene, 1,3-pentadiene, and chloroprene. Any one of these conjugated diene monomers may be used alone or any two or more of these conjugated diene monomers may be used in combination. Among these conjugated diene monomers, 1,3-butadiene and isoprene are particularly preferable to be used.

Although no specific limitations are placed on the monomer that is copolymerizable with the conjugated diene monomer, specific examples include aromatic vinyl monomers, ethylenically unsaturated nitrile monomers, ethylenically unsaturated acid monomers, ethylenically unsaturated acid derivative monomers, vinyl heterocyclic compound monomers, carboxylic acid vinyl ester monomers, halogenated vinyl monomers, vinyl ether monomers, and olefin monomers. Any one of these copolymerizable monomers may be used alone or any two or more of these copolymerizable monomers may be used in combination. Among these copolymerizable monomers, aromatic vinyl monomers, ethylenically unsaturated nitrile monomers, ethylenically unsaturated acid monomers, and ethylenically unsaturated acid derivative monomers are suitable.

Specific examples of aromatic vinyl monomers that can be used include styrene, α-methylstyrene, monochlorostyrene, dichorostyrene, monomethylstyrene, dimethyl styrene, trimethylstyrene, and hydroxymethyl styrene.

Specific examples of ethylenically unsaturated nitrile monomers that can be used include acrylonitrile, methacrylonitrile, fumaronitrile, α-chloroacrylonitrile, and α-cyanoethylacrylonitrile.

Specific examples of ethylenically unsaturated acid monomers that can be used include monovalent carboxylic acids having an ethylenically unsaturated bond such as acrylic acid, methacrylic acid, and crotonic acid, and polyvalent carboxylic acids having an ethylenically unsaturated bond such as fumaric acid, maleic acid, itaconic acid, and butene tricarboxylic acid.

Specific examples of ethylenically unsaturated acid derivative monomers that can be used include esters, anhydrides, and amides of ethylenically unsaturated acids.

Specific examples of ethylenically unsaturated acid ester monomers that can be used include methyl (meth)acrylate, ethyl (meth)acrylate, propyl (meth)acrylate, butyl (meth) acrylate, 2-ethylhexyl (meth)acrylate, decyl (meth)acrylate, dodecyl (meth)acrylate, 2-hydroxyethyl (meth)acrylate, and dimethylaminoethyl (meth)acrylate.

Specific examples of ethylenically unsaturated acid anhydride monomers that can be used include maleic anhydride and itaconic anhydride.

Specific examples of ethylenically unsaturated acid amide monomers that can be used include (meth)acrylamide, N-methylol (meth)acrylamide, N,N-dimethyl (meth)acrylamide, and (meth)acrylamido-2-methylpropane sulfonic acid and the sodium salt thereof.

In the present description, "(meth)acryl" refers to "acryl" and/or "methacryl."

Specific examples of vinyl heterocyclic compound monomers that can be used include vinylpyridine and N-vinylpyrrolidone.

Specific examples of carboxylic acid vinyl ester monomers that can be used include vinyl formate, vinyl acetate, vinyl propionate, vinyl pivalate, isopropenyl acetate, and vinyl versatate.

Specific examples of halogenated vinyl monomers that can be used include vinyl chloride, vinylidene chloride, vinyl fluoride, and vinylidene fluoride.

Specific examples of vinyl ether monomers that can be used include methyl vinyl ether, n-propyl vinyl ether, isopropyl vinyl ether, n-butyl vinyl ether, isobutyl vinyl ether, t-butyl vinyl ether, and dodecyl vinyl ether.

Specific examples of olefin monomers that can be used include ethylene, propylene, 1-butene, and isobutene.

Specific examples of suitable conjugated diene rubbers include polybutadiene rubber, polyisoprene rubber, copolymer rubber of an aromatic vinyl monomer and butadiene, copolymer rubber of a monomer having a carboxy group (for example, a monovalent carboxylic acid or a polyvalent carboxylic acid), an aromatic vinyl monomer, and butadiene, copolymer rubber of an aromatic vinyl monomer and isoprene, copolymer rubber of a monomer having a carboxy group, an aromatic vinyl monomer, and isoprene, copolymer rubber of acrylonitrile and butadiene, copolymer rubber of a monomer having a carboxy group, acrylonitrile, and butadiene, copolymer rubber of acrylonitrile and isoprene, copolymer rubber of a monomer having a carboxy group, acrylonitrile, and isoprene, copolymer rubber of acrylonitrile, butadiene, and isoprene, copolymer rubber of a monomer having a carboxy group, acrylonitrile, butadiene, and isoprene, block copolymer rubber of an aromatic vinyl monomer, butadiene, and an aromatic vinyl monomer, block copolymer of an aromatic vinyl monomer, isoprene, and an aromatic vinyl monomer, and hydrogenated products of any of the preceding rubbers.

Among these conjugated diene rubbers, copolymer rubber of an aromatic vinyl monomer and butadiene and copolymer rubber of acrylonitrile and butadiene are preferable in the present disclosure.

The weight-average molecular weight and the glass-transition temperature of the polymer (solid component) of the latex used in the present disclosure can be freely determined in accordance with the intended use of the latex composition.

Although no specific limitations are placed on the concentration of the polymer in the latex, the concentration is preferably at least 10 mass % and no greater than 74 mass %, more preferably at least 20 mass % and no greater than 70 mass %, and particularly preferably at least 30 mass % and no greater than 60 mass %.

If the concentration of the polymer is too low, the viscosity of the latex may be too low and the polymer component may separate during storage of the latex. Conversely, if the concentration of the polymer is too high, the polymer component may aggregate.

Although no specific limitations are placed on the method by which the polymer constituting the latex is produced, any of conventional commonly known methods such as emulsion polymerization, suspension polymerization, and solution polymerization may be used. Among these methods, emulsion polymerization is preferable for producing the polymer. The polymer produced by emulsion polymerization may be used as-produced to prepare the latex or may be used to prepare the latex after, for example, undergoing a process in which the polymer is coagulated and purified.

Of course, a polymer produced by solution polymerization or suspension polymerization may be converted to a solid polymer, and this solid polymer may be used after dissolution in a solvent or dispersion in a solvent and conversion to an emulsion state.

A tetrahydrofuran-insoluble component content of the polymer in the latex is required to be at least 1 mass % and no greater than 75 mass %. Moreover, the tetrahydrofuran-insoluble component content of the polymer is preferably at least 2 mass % and no greater than 70 mass %, more preferably at least 2 mass % and no greater than 65 mass %, and particularly preferably at least 5 mass % and no greater than 60 mass %. If the tetrahydrofuran-insoluble component content of the polymer is too small, it may be insufficient in the improving effect of conductivity when the polymer is used in combination with carbon nanotubes having the prescribed properties described further below. Conversely, if the tetrahydrofuran-insoluble component content is too large, the dispersibility of carbon nanotubes and other additives may be adversely affected, lowering processability of composite material and conductive formed product.

In the present disclosure, the term "tetrahydrofuran-insoluble component content" refers to the mass of an insoluble component when 200 mg of the polymer is immersed in 100 mL of tetrahydrofuran (THF) for 48 hours at 25° C., expressed as a proportion of the total polymer mass prior to immersion in THF.

Although no specific limitations are placed on the method by which the tetrahydrofuran-insoluble component content is adjusted, adjustment can for example be performed by a method in which (i) the degree of cross-linking of the polymer is adjusted through selection of the polymerization temperature, the type(s) of monomer(s), the amount(s) of monomer(s), and so forth, (ii) the amount of tetrahydrofuran-insoluble component that is produced is adjusted using a reaction inhibitor or the like, or (iii) polymers with different tetrahydrofuran-insoluble component contents are blended.

<Carbon Nanotubes>

The carbon nanotubes included in the presently disclosed latex composition are required to have an average diameter (Av) and a diameter distribution ($3\sigma$) satisfying a relationship $0.60>3\sigma/Av>0.20$. When carbon nanotubes for which the ratio of the diameter distribution ($3\sigma$) relative to the average diameter (Av) is greater than 0.20 and less than 0.60 are combined with a polymer having the tetrahydrofuran-insoluble component content described above, a composite material and a conductive formed product having superior conductivity can be obtained even if only a small amount of the carbon nanotubes is used. From a viewpoint of further improving properties of the composite material and the conductive formed product obtained using the latex composition, the carbon nanotubes preferably satisfy a relationship $0.60>3\sigma/Av>0.25$, and more preferably satisfy a relationship $0.60>3\sigma/Av>0.50$.

Although the reason that a composite material and a conductive formed product having superior conductivity can be obtained by combining the above-described carbon nanotubes with a polymer having the above-described tetrahydrofuran-insoluble component content is not clear, the reason is presumed to be that a tetrahydrofuran-soluble component can favorably mix with the above-described carbon nanotubes during production of the composite material or the conductive formed product, whereas a tetrahydrofuran-insoluble component cannot favorably mix with the above-described carbon nanotubes during production of the composite material or and the conductive formed product. In other words, it is presumed that a composite material and a conductive formed product demonstrating superior conductivity can be obtained through the tetrahydrofuran-soluble component that mixes favorably with the carbon nanotubes and the tetrahydrofuran-insoluble component that does not mix favorably with the carbon nanotubes being finely mixed in a prescribed ratio.

In the present disclosure, "diameter distribution ($3\sigma$)" refers to a value obtained by multiplying the standard deviation ($\sigma$) of the diameters of the carbon nanotubes by 3. The "average diameter (Av)" and the "diameter distribution ($3\sigma$)" can each be obtained by measuring the diameters (outer diameters) of 100 carbon nanotubes using a transmission electron microscope.

The average diameter (Av) and the diameter distribution ($3\sigma$) may be adjusted by altering the production method or the production conditions of the carbon nanotubes or may be adjusted by combining a plurality of types of carbon nanotubes obtained by different production methods.

The carbon nanotubes preferably take a normal distribution when diameter is plotted on a horizontal axis and the probability density of the diameter is plotted on a vertical axis, and a Gaussian approximation is made. It is difficult to obtain a normal distribution in a situation in which a plurality of types of carbon nanotubes, such as carbon nanotubes obtained by different production methods, are combined. In other words, in the present disclosure, the carbon nanotubes are preferably a single type of carbon nanotubes or carbon nanotubes obtained by blending a single type of carbon nanotubes with an amount of other carbon nanotubes that does not affect the distribution of the single type of carbon nanotubes.

The carbon nanotubes may be single-walled carbon nanotubes or multi-walled carbon nanotubes. However, from a viewpoint of improving properties (for example, conductivity and mechanical properties) of the composite material and the conductive formed product produced using the latex composition, the carbon nanotubes preferably have from one to five walls and more preferably have one wall.

The carbon nanotubes preferably exhibit a radial breathing mode (RBM) peak when evaluated by Raman spectroscopy. Note that an RBM is not present in the Raman spectrum of a multi-walled carbon nanotube having three or more walls.

From a viewpoint of imparting high conductivity on the composite material and the conductive formed product, the average diameter (Av) of the carbon nanotubes is preferably at least 0.5 nm, and more preferably at least 1 nm, and is preferably no greater than 15 nm, more preferably no greater than 10 nm, and particularly preferably no greater than 8 nm.

In a Raman spectrum of the carbon nanotubes, a ratio of G band peak intensity relative to D band peak intensity (G/D ratio) is preferably at least 1 and no greater than 20. A G/D ratio of at least 1 and no greater than 20 enables superior conductivity to be imparted even if the blended amount of carbon nanotubes is small.

Furthermore, a structure of the carbon nanotubes preferably has a length of at least 100 μm and no greater than 5,000 μm. A length of at least 100 μm and no greater than 5,000 μm enables superior conductivity to be imparted even if the blended amount of carbon nanotubes is small.

The carbon nanotubes preferably have a specific surface area of at least 600 m$^2$/g. In a situation in which the carbon nanotubes are mainly closed tubes, the specific surface area is preferably at least 600 m$^2$/g, and in a situation in which the carbon nanotubes are mainly open tubes, the specific surface area is more preferably at least 1,300 m$^2$/g. A specific surface area of at least 600 m$^2$/g enables superior conductivity to be imparted even if the blended amount of carbon nanotubes is small.

The specific surface area of the carbon nanotubes can be obtained as a nitrogen adsorption specific surface area by a BET method.

The carbon nanotubes preferably have a weight density of at least 0.002 g/cm$^3$ and no greater than 0.2 g/cm$^3$. A weight density of no greater than 0.2 g/cm$^3$ facilitates homogeneous dispersion of the carbon nanotubes in the dispersion liquid and in the latex composition due to the carbon nanotubes only being weakly bonded to one another. In other words, a weight density of no greater than 0.2 g/cm$^3$ facilitates preparation of a homogeneous dispersion liquid and a homogeneous latex composition. A weight density of at least 0.002 g/cm$^3$ facilitates handling of the carbon nanotubes by improving unity of the carbon nanotubes and inhibiting the carbon nanotubes from coming apart.

The carbon nanotubes having the properties described above are preferably carbon nanotubes obtained through the super growth method (hereinafter may be referred to as "SGCNTs"). The super growth method is described, for example, in NPL 1, Japanese Patent No. 4,621,896 (European Patent Application Publication No. 1787955), and Japanese Patent No. 4,811,712 (United States Patent Application Publication No. 2009/297846).

The super growth method is a CVD method in which a catalyst activating material such as water is brought into contact with a catalyst in accompaniment to a feedstock gas in order to dramatically increase activity and lifetime of the catalyst.

The amount of the carbon nanotubes blended into the latex composition relative to 100 parts by mass of the polymer (solid component) constituting the latex is normally at least 0.01 parts by mass and no greater than 15 parts by mass, preferably at least 0.1 parts by mass, and more preferably at least 0.25 parts by mass, and preferably no greater than 10 parts by mass, and more preferably no greater than 7.5 parts by mass. If the amount of carbon nanotubes is too small, conductivity cannot be ensured. Conversely, if the amount of carbon nanotubes is too large, fluidity of the composite material obtained using the latex composition is reduced, leading to poorer formability.

<Additives>

A cross-linking agent may optionally be blended with the latex composition in order to ensure formability of the composite material and mechanical strength of the conductive formed product. Moreover, properties of the composite material and the conductive formed product may be improved or maintained by optionally blending the latex composition with a plasticizer, an antioxidant, a heat stabilizer, a light stabilizer, an ultraviolet absorber, a pigment, a colorant, a foaming agent, a flame retardant, a lubricant, a softener, a tackifier, a mold release agent, a deodorant, a perfume, or the like.

It should be noted that instead of blending these additives with the latex composition, these additives may be directly blended with the composite material produced using the latex composition. Furthermore, one portion of an additive may be blended with the latex composition and a remaining portion of the additive may be directly blended with the composite material.

No specific limitations are placed on the cross-linking agent that is blended as necessary, other than being a cross-linking agent that is normally used as a typical rubber cross-linking agent. Representative examples of the cross-linking agent include sulfuric cross-linking agents and organic peroxide cross-linking agents, among which, a sulfuric cross-linking agent is preferable.

Examples of sulfuric cross-linking agents that can be used include sulfur such as powdered sulfur, flowers of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithiobis(hexahydro-2H-azenopin-2), phosphorus-containing polysulfides, and polymeric polysulfides; and sulfur donor compounds such as tetramethyl thiuram disulfide, selenium dimethyl dithiocarbamate, and 2-(4'-morpholinodithio)benzothiazole.

If a sulfuric cross-linking agent is used, a cross-linking aid such as zinc flower or stearic acid; or a cross-linking promotor such as those that are based on guanidine, aldehyde-amine, aldehyde-ammonia, thiazole, sulfenamide, or thiourea may be used in combination with the sulfuric cross-linking agent.

Examples of organic peroxide cross-linking agents that can be used include dicumyl peroxide, cumene hydroperoxide, t-butyl cumyl peroxide, para-menthane hydroperoxide, di-t-butyl peroxide, 1,3-bis and 1,4-bis(t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, and t-butylperoxy benzoate.

If an organic peroxide cross-linking agent is used, a polyfunctional compound such as trimethylolpropane trimethacrylate, divinyl benzene, ethylene dimethacrylate, or triallyl isocyanurate can for example be used as a cross-linking aid in combination with the organic peroxide cross-linking agent.

Although no specific limitations are placed on the amount of the cross-linking agent that is used, the amount of the cross-linking agent relative to 100 parts by mass of the polymer is preferably at least 0.1 parts by mass and no greater than 10 parts by mass, and more preferably at least 0.2 parts by mass and no greater than 5 parts by mass.

Furthermore, although no specific limitations are placed on the amount of the cross-linking aid or cross-linking promoter that is used in combination with the sulfuric cross-linking agent, the amount is preferably at least 0.1 parts by mass and no greater than 10 parts by mass relative to 100 parts by mass of the polymer.

Moreover, although no specific limitations are placed on the amount of the crosslinking aid that is used in combination with the organic peroxide crosslinking agent, the amount is preferably at least 0.5 parts by mass and no greater than 20 parts by mass relative to 100 parts by mass of the polymer.

The plasticizer that is blended as necessary is preferably added to and mixed with the latex composition as an aqueous emulsion. Blending of the plasticizer as an aqueous emulsion enables micro-level homogenous mixing of the polymer in the latex, the carbon nanotubes, and the plasticizer such that bleeding of the plasticizer is less likely to occur and facilitates preparation of a composite material having superior properties.

Although no specific limitations are placed on the method by which the aqueous emulsion of the plasticizer is prepared, a preparation method in which the plasticizer is added to an aqueous medium containing a surfactant in an amount equivalent to from 0.5 mass % to 10 mass % of the plasticizer while vigorously stirring the aqueous medium is preferable. Examples of the surfactant include anionic surfactants such as potassium rosinate, sodium lauryl sulfate, potassium oleate, and sodium dodecylbenzenesulfonate; non-ionic surfactants such as polyoxyethylene alkyl ether, polyoxyethylene alkyl ester, and polyoxyethylene sorbitan alkyl ester; and cationic surfactants such as didecyldimethyl ammonium chloride and stearyl trimethyl ammonium chloride. The concentration of the plasticizer in the aqueous emulsion is preferably from 5 mass % to 70 mass %.

(Latex Composition Production Method)

No specific limitations are placed on the method by which the above-described latex and the above-described carbon nanotubes are mixed to produce the latex composition. Examples of methods that can be used to produce the latex composition include, for example, (I) a method in which a powder of the carbon nanotubes is added to the latex and dispersed by dispersion treatment and (II) a method in which the latex is mixed with a carbon nanotube dispersion liquid in which the carbon nanotubes are already dispersed in a solvent such as water. Among these methods, method (II) is preferable from a viewpoint of increasing dispersibility of the carbon nanotubes.

In the above-described method (II), the carbon nanotube dispersion liquid can be obtained by adding the above-described carbon nanotubes to a dispersant aqueous solution in which a dispersant is dissolved as necessary and subjecting the resultant mixture to dispersion treatment by a dispersion method that brings about a cavitation effect. A dispersion method that brings about a cavitation effect can also be used for dispersion treatment in the above-described method (I).

Examples of dispersants that can be used to disperse the carbon nanotubes include surfactants and polysaccharides. From a viewpoint of dispersibility of the carbon nanotubes, a surfactant is preferable and an anionic surfactant is more preferable.

A dispersion method that brings about a cavitation effect utilizes shock waves caused by the rupture of vacuum bubbles formed in water when high energy is applied to the liquid. This dispersion method enables dispersion of the carbon nanotubes in the water without damaging the properties of the carbon nanotubes. Specific examples of dispersion treatments utilizing a dispersion method that brings about a cavitation effect include dispersion treatment using ultrasound, dispersion treatment using a jet mill, and dispersion treatment using high-shear stirring. These dispersion treatments may be performed alone or in combination.

Specifically, an ultrasonic homogenizer, a jet mill, and a high-shear stirring device are suited for carrying out these dispersion treatments. Conventional commonly known devices may be used as the aforementioned devices.

Although no specific limitations are placed on the method by which the latex and the carbon nanotube dispersion liquid are mixed, mixing may be performed by a stirring method that enables homogeneous mixing of the latex and the carbon nanotube dispersion liquid.

(Composite Material)

The presently disclosed composite material can be produced using the latex composition described above. Specifically, the composite material may for example be obtained simply by drying the above-described latex composition or by causing the above-described latex composition to coagulate to form crumbs and then drying the crumbs. The composite material produced using the above-described latex composition includes the above-described polymer and carbon nanotubes and, as a consequence, has superior properties such as conductivity.

Although no specific limitations are placed on the method by which the latex composition is coagulated, examples of methods that can be used include a method in which the latex composition is added to a water-soluble organic solvent, a method in which an acid is added to the latex composition, a method in which a salt is added to the latex composition, and a method in which the latex composition is added to an aqueous solution containing a coagulant and is salted out. Among these methods, the method in which the latex composition is added to an aqueous solution containing a coagulant and is salted out is preferable. Examples coagulants that can be used include calcium chloride, sodium chloride, calcium hydroxide, aluminum sulfate, and aluminum hydroxide. The amount of the coagulant that is used relative to 100 parts by mass of the polymer (solid component) constituting the latex is preferably at least 0.5 parts by mass and no greater than 150 parts by mass, and more preferably at least 0.5 parts by mass and no greater than 20 parts by mass.

In a situation in which the polymer constituting the latex includes a cationic monomeric unit such as dodecyltrimethylammonium bromide, cetyltrimethylammonium bromide, or distearyldimethylammonium chloride, a dilute sulfuric acid aqueous solution or the like is preferably added in salting out of the latex composition in order to adjust the pH of the coagulant aqueous solution to less than or equal to the isoelectric point of the latex composition. This adjustment of the pH of the coagulant aqueous solution increases the zeta-potential of a functional group of the cationic monomeric unit contained in the polymer constituting the latex, which improves dispersibility of the carbon nanotubes and enables crumbs of large particle diameter to be obtained through coagulation. The particle diameter of the crumbs has a significant influence on the degree of dehydration and the crumb recovery rate in processing by a shaker screen or squeezer after coagulation and washing processes, and also on dryness in a drying process, thus the average particle diameter of the crumbs is preferably at least 0.5 mm and no greater than 40 mm.

Washing, dehydration, and drying of the crumbs can be carried out by the same washing, dehydration, and drying methods as used in normal rubber production. In one specific example, the crumbs resulting from coagulation are first separated from water using a mesh filter, a centrifugal separator, or the like, are subsequently washed, and are then dehydrated using a squeezer or the like. Next, the crumbs are dried until they reach a desired water content using a band dryer, a vertical through-dryer, a single-screw extruder, a twin-screw extruder, or the like that is commonly used in rubber production to obtain the composite material containing the carbon nanotubes and the polymer. Note that the composite material may be obtained by carrying out coagulation and drying simultaneously in a twin-screw extruder.

Furthermore, the composite material may be produced by further adding additives such as an anti-aging agent and a reinforcing agent as necessary to a composite obtained by coagulating the latex composition (optionally including additives such as a plasticizer and a resin other than the polymer constituting the latex) and drying the resultant crumbs, followed by kneading with using a kneading device such as a roll kneader or a Banbury mixer.

(Conductive Formed Product)

The presently disclosed conductive formed product can be produced using the composite material described above. Although no specific limitations are placed on the method by which the formed product is obtained using the composite material, the formed product can for example be obtained by a method in which forming is carried out using a forming machine, such as an extruder, an injection molder, a compressor, or a roller, that is suited to the desired shape of the formed product and in which cross-linking is carried out as necessary to fix the shape of the formed product. The cross-linking may be performed after or during the forming. The forming temperature is preferably from 10° C. to 200° C., and more preferably from 25° C. to 120° C. The cross-linking temperature is preferably from 100° C. to 200° C., more preferably from 130° C. to 190° C., and particularly preferably from 140° C. to 180° C. The cross-linking time is preferably from 1 minute to 5 hours, and more preferably from 2 minutes to 1 hour.

Depending on the shape, dimensions, and so forth of the formed product, secondary cross-linking may be carried out because internal cross-linking of the formed product may be insufficient even if cross-linking occurs at the surface of the formed product.

The presently disclosed conductive formed product includes the above-described polymer and carbon nanotubes and, as a consequence, has superior properties such as conductivity.

EXAMPLES

The following provides more specific explanation of the present disclosure through examples and comparative examples. However, the present disclosure is not limited to the following examples.

In the following examples and comparative examples, "parts" and "%" refer to amounts on a mass basis unless otherwise specified. Surface resistivity and volume conductivity were measured in the examples and comparative examples as follows.

(Surface Resistivity)

After forming an applied film into a circular thin-film of approximately 40 mm to 60 mm in diameter and 100 μm to 500 μm in thickness, four square test pieces of 10 mm×10 mm were cut out to be used as measurement samples.

The surface resistivity of each of the measurement samples was measured by a method in accordance with JIS K7194 as described below using a low resistivity meter (product name: Loresta®-GPMCP-T610 (Loresta is a registered trademark in Japan, other countries, or both); produced by Mitsubishi Chemical Analytech, Co., Ltd.). A PSP probe was selected as a four-pin probe of the low resistivity meter.

Specifically, a measurement sample was mounted on an insulating board, the probe was pressed against a central position of the measurement sample (position 5 mm vertically and 5 mm laterally), and surface resistivity was measured by applying voltage having a maximum value of 90 V. Surface resistivity was measured at 50 random locations on the four measurement sample test pieces and an average value was calculated.

(Volume Conductivity)

Vacuum press forming of 450 mg of an obtained test piece was performed in a vacuum at a temperature of 120° C. with a pressure of 0.4 MPa for a pressing time of 5 minutes to form a circular thin-film of approximately 40 mm to 60 mm in diameter and 100 μm to 500 μm in thickness. Four square test pieces of 10 mm×10 mm were then cut out to be used as measurement samples.

The volume conductivity of each of the measurement samples was measured by a method in accordance with JIS K7194 as described below using the low resistivity meter (product name: Loresta®-GPMCP-T610; produced by Mitsubishi Chemical Analytech, Co., Ltd.). A PSP probe was selected as a four-pin probe of the low resistivity meter.

Specifically, a measurement sample was mounted on an insulating board, the probe was pressed against a central position of the measurement sample (position 5 mm vertically and 5 mm laterally), and conductivity was measured by applying voltage having a maximum value of 90 V. Conductivity was measured at 50 random locations on the four measurement sample test pieces and an average value was calculated.

Production Example 1

SGCNTs-1 were synthesized under the following conditions by the super growth method described in Japanese Patent No. 4,621,896.

—Synthetic Conditions—

Carbon compound: Ethylene (supply rate: 50 sccm)
Atmospheric gas: Mixed gas of helium and hydrogen (supply rate: 1,000 sccm)
Pressure: 1 atm
Additive amount of water vapor: 300 mass ppm
Reaction temperature: 750° C.
Reaction time: 10 minutes
Metal catalyst: Iron thin-film (thickness: 1 nm)
Substrate: Silicon wafer The resultant SGCNTs-1 had a BET specific surface area of 1,050 $m^2/g$. When the SGCNTs-1 were measured using a Raman spectrophotometer, a radial breathing mode (RBM) spectrum was observed in a low-wavenumber domain from 100 cm' to 300 cm', which is characteristic of single-walled carbon nanotubes. When the diameters of 100 randomly selected tubes from among the SGCNTs-1 were measured using a transmission electron microscope, the average diameter (Av) was 3.3 nm, the diameter distribution (3σ) was 1.9 nm, and 3σ/Av was 0.58.

Production Example 2

In Production Example 2, 30 mg of the SGCNTs-1 were added to 300 mL of a 1 mass % aqueous solution of sodium lauryl sulfate (product name: Emal® O (Emal is a registered trademark in Japan, other countries, or both); produced by Kao Corporation) and a jet mill (product name: JN20; produced by Jokoh Co., Ltd.) was used to obtain an aggregate-free SGCNT-1 dispersion liquid.

Production Example 3

The same operation as in Production Example 2 was performed with the exception that 30 mg of HiPco® (HiPco is a registered trademark in Japan, other countries, or both) was added to 300 mL of a 1 mass % aqueous solution of sodium lauryl sulfate (product name: Emal® O; produced by Kao Corporation) to obtain an aggregate-free HiPco-1 dispersion liquid. The HiPco® was produced by NanoIntegris Inc. and had a BET specific surface area of 700 m²/g. When the diameters of 100 randomly selected tubes from among the HiPco® were measured using a transmission electron microscope, the average diameter (Av) was 1.1 nm, the diameter distribution (3σ) was 0.2 nm, and 3σ/Av was 0.18.

Production Example 4

The same operation as in Production Example 2 was performed with the exception that 30 mg of NC7000 was added to 300 mL of a 1 mass % aqueous solution of sodium lauryl sulfate (product name: Emal® O; produced by Kao Corporation) to obtain an aggregate-free NC7000-1 dispersion liquid. The NC7000 was produced by Nanocyl and had a BET specific surface area of 290 m²/g. When the diameters of 100 randomly selected tubes from among the NC7000 were measured using a transmission electron microscope, the average diameter (Av) was 9.3 nm, the diameter distribution (3σ) was 2.6 nm, and 3σ/Av was 0.28.

Example 1-1

In Example 1-1, 5.063 g of the SGCNT-1 dispersion liquid was mixed with 0.5 g of an acrylonitrile-butadiene-based latex (product name: CYATEX® NA-20 (CYATEX is a registered trademark in Japan, other countries, or both); produced by Nippon A&L Inc.; THF-insoluble component content of acrylonitrile-butadiene rubber (polymer): 70%) to achieve a ratio of 2 parts of carbon nanotubes relative to 100 parts of polymer and the mixture was stirred for 1 hour to obtain an SGCNT-1/rubber mixed solution (latex composition). The resultant mixed solution was poured into a glass petri dish and was held in a dry air flow environment at 50° C. for 48 hours to evaporate moisture and obtain an applied film (composite material). A surface resistivity of 83 Ω/sq. was measured using the applied film.

Example 1-2

An applied film was obtained through the same operation as in Example 1-1 with the exception that the latex used in Example 1-1 was changed to other acrylonitrile-butadiene-based latex (product name: Nipol® Lx554 (Nipol is a registered trademark in Japan, other countries, or both); produced by Zeon Corporation; THF-insoluble component content of acrylonitrile-butadiene rubber: 60%). A surface resistivity of 117 Ω/sq. was measured using the applied film.

Example 1-3

An applied film was obtained through the same operation as in Example 1-1 with the exception that the latex used in Example 1-1 was changed to other acrylonitrile-butadiene-based latex (product name: Nipol® Lx553; produced by Zeon Corporation; THF-insoluble component content of acrylonitrile-butadiene rubber: 43%). A surface resistivity of 134 Ω/sq. was measured using the applied film.

Example 1-4

An applied film was obtained through the same operation as in Example 1-1 with the exception that the latex used in Example 1-1 was changed to other acrylonitrile-butadiene-based latex (product name: Nipol® Lx552; produced by Zeon Corporation; THF-insoluble component content of acrylonitrile-butadiene rubber: 27%). A surface resistivity of 176 Ω/sq. was measured using the applied film.

Comparative Example 1

An applied film was obtained through the same operation as in Example 1-1 with the exception that the latex used in Example 1-1 was changed to other acrylonitrile-butadiene-based latex (product name: Nipol® Lx551; produced by Zeon Corporation; THF-insoluble component content of acrylonitrile-butadiene rubber: 0%). A surface resistivity of 504 Ω/sq. was measured using the applied film.

Example 2-1

An applied film was obtained through the same operation as in Example 1-1 with the exception that the mixing ratio was changed to 2.521 g of the SGCNT-1 dispersion liquid and 0.5 g of the latex such that the amount of carbon nanotubes was 1 part relative to 100 parts of polymer. A surface resistivity of 2,117 Ω/sq. was measured using the applied film.

Example 2-2

An applied film was obtained through the same operation as in Example 1-2 with the exception that the mixing ratio of the SGCNT-1 dispersion liquid and the latex was changed in the same way as in Example 2-1 such that the amount of carbon nanotubes was 1 part relative to 100 parts of polymer. A surface resistivity of 2,476 Ω/sq. was measured using the applied film.

Example 2-3

An applied film was obtained through the same operation as in Example 1-3 with the exception that the mixing ratio of the SGCNT-1 dispersion liquid and the latex was changed in the same way as in Example 2-1 such that the amount of carbon nanotubes was 1 part relative to 100 parts of polymer. A surface resistivity of 2,825 Ω/sq. was measured using the applied film.

Example 2-4

An applied film was obtained through the same operation as in Example 1-4 with the exception that the mixing ratio of the SGCNT-1 dispersion liquid and the latex was changed in the same way as in Example 2-1 such that the amount of carbon nanotubes was 1 part relative to 100 parts of polymer. A surface resistivity of 2,959 Ω/sq. was measured using the applied film.

Comparative Example 2

An applied film was obtained through the same operation as in Comparative Example 1 with the exception that the mixing ratio of the SGCNT-1 dispersion liquid and the latex was changed in the same way as in Example 2-1 such that the amount of carbon nanotubes was 1 part relative to 100 parts of polymer. A surface resistivity of 8,025 Ω/sq. was measured using the applied film.

Example 3-1

In Example 3-1, 12.5 g of the NC7000-1 dispersion liquid was mixed with 0.5 g of an acrylonitrile-butadiene-based latex (product name: CYATEX® NA-20; produced by Nippon A&L Inc.; THF-insoluble component content of acrylonitrile-butadiene rubber: 70%) to achieve a ratio of 5 parts of carbon nanotubes relative to 100 parts of polymer and the mixture was stirred for 1 hour to obtain an NC7000-1/rubber mixed solution. The resultant mixed solution was poured into a glass petri dish and was held in a dry air flow environment at 50° C. for 48 hours to evaporate moisture and obtain an applied film. A surface resistivity of 1,136 Ω/sq. was measured using the applied film.

Example 3-2

An applied film was obtained through the same operation as in Example 3-1 with the exception that the latex used in Example 3-1 was changed to other acrylonitrile-butadiene-based latex (product name: Nipol® Lx554; produced by Zeon Corporation; THF-insoluble component content of acrylonitrile-butadiene rubber: 60%). A surface resistivity of 1,351 Ω/sq. was measured using the applied film.

Example 3-3

An applied film was obtained through the same operation as in Example 3-1 with the exception that the latex used in Example 3-1 was changed to other acrylonitrile-butadiene-based latex (product name: Nipol® Lx553; produced by Zeon Corporation; THF-insoluble component content of acrylonitrile-butadiene rubber: 43%). A surface resistivity of 1,587 Ω/sq. was measured using the applied film.

Example 3-4

An applied film was obtained through the same operation as in Example 3-1 with the exception that the latex used in Example 3-1 was changed to other acrylonitrile-butadiene-based latex (product name: Nipol® Lx552; produced by Zeon Corporation; THF-insoluble component content of acrylonitrile-butadiene rubber: 27%). A surface resistivity of 1,876 Ω/sq. was measured using the applied film.

Comparative Example 3

An applied film was obtained through the same operation as in Example 3-1 with the exception that the latex used in Example 3-1 was changed to other acrylonitrile-butadiene-based latex (product name: Nipol® Lx551; produced by Zeon Corporation; THF-insoluble component content of acrylonitrile-butadiene rubber: 0%). Surface resistivity could not be measured using the applied film (i.e., surface resistivity exceeded the measurement limit of $10^7$ Ω/sq.).

Example 4-1

In Example 4-1, 5.063 g of the SGCNT-1 dispersion liquid was mixed with 0.5 g of an acrylonitrile-butadiene-based latex (product name: CYATEX® NA-20; produced by Nippon A&L Inc.; THF-insoluble component content of acrylonitrile-butadiene rubber: 70%) to achieve a ratio of 2 parts of carbon nanotubes relative to 100 parts of polymer and the mixture was stirred for 1 hour to obtain an SGCNT-1/rubber mixed solution. The resultant mixed solution was poured into 2-propanol to coagulate and after 1 hour of stirring was filtered to collect coagulated material. The coagulated material was dried under reduced pressure at 40° C. for 12 hours to obtain a test piece. A volume conductivity of 0.51943 S/cm was measured using the test piece.

Example 4-2

A test piece was obtained through the same operation as in Example 4-1 with the exception that the latex used in Example 4-1 was changed to other acrylonitrile-butadiene-based latex (product name: Nipol® Lx554; produced by Zeon Corporation; THF-insoluble component content of acrylonitrile-butadiene rubber: 60%). A volume conductivity of 0.42786 S/cm was measured using the test piece.

Example 4-3

A test piece was obtained through the same operation as in Example 4-1 with the exception that the latex used in Example 4-1 was changed to other acrylonitrile-butadiene-based latex (product name: Nipol® Lx553; produced by Zeon Corporation; THF-insoluble component content of acrylonitrile-butadiene rubber: 43%). A volume conductivity of 0.32582 S/cm was measured using the test piece.

Example 4-4

A test piece was obtained through the same operation as in Example 4-1 with the exception that the latex used in Example 4-1 was changed to other acrylonitrile-butadiene-based latex (product name: Nipol® Lx552; produced by Zeon Corporation; THF-insoluble component content of acrylonitrile-butadiene rubber: 27%). A volume conductivity of 0.26036 S/cm was measured using the test piece.

Comparative Example 4

A test piece was obtained through the same operation as in Example 4-1 with the exception that the latex used in Example 4-1 was changed to other acrylonitrile-butadiene-based latex (product name: Nipol® Lx551; produced by Zeon Corporation; THF-insoluble component content of acrylonitrile-butadiene rubber: 0%). A volume conductivity of 0.03214 S/cm was measured using the test piece.

Example 5-1

In Example 5-1, 2.516 g of the SGCNT-1 dispersion liquid was mixed with 0.5 g of an acrylonitrile-butadiene-based latex (product name: CYATEX® NA-20; produced by Nippon A&L Inc.; THF-insoluble component content of acrylonitrile-butadiene rubber: 70%) to achieve a ratio of 1 part of carbon nanotubes relative to 100 parts of polymer and the mixture was stirred for 1 hour to obtain an SGCNT-1/rubber mixed solution. The resultant mixed solution was poured into 2-propanol to coagulate and after 1 hour of stirring was filtered to collect coagulated material. The coagulated material was dried under reduced pressure at 40° C. for 12 hours to obtain a test piece. A volume conductivity of 0.052428 S/cm was measured using the test piece.

Example 5-2

A test piece was obtained through the same operation as in Example 5-1 with the exception that the latex used in Example 5-1 was changed to other acrylonitrile-butadiene-based latex (product name: Nipol® Lx554; produced by Zeon Corporation; THF-insoluble component content of acrylonitrile-butadiene rubber: 60%). A volume conductivity of 0.048729 S/cm was measured using the test piece.

Example 5-3

A test piece was obtained through the same operation as in Example 5-1 with the exception that the latex used in Example 5-1 was changed to other acrylonitrile-butadiene-based latex (product name: Nipol® Lx553; produced by Zeon Corporation; THF-insoluble component content of acrylonitrile-butadiene rubber: 43%). A volume conductivity of 0.044414 S/cm was measured using the test piece.

Example 5-4

A test piece was obtained through the same operation as in Example 5-1 with the exception that the latex used in Example 5-1 was changed to other acrylonitrile-butadiene-based latex (product name: Nipol® Lx552; produced by Zeon Corporation; THF-insoluble component content of acrylonitrile-butadiene rubber: 27%). A volume conductivity of 0.021484 S/cm was measured using the test piece.

Comparative Example 5

A test piece was obtained through the same operation as in Example 5-1 with the exception that the latex used in Example 5-1 was changed to other acrylonitrile-butadiene-based latex (product name: Nipol® Lx551; produced by Zeon Corporation; THF-insoluble component content of acrylonitrile-butadiene rubber: 0%). A volume conductivity of 0.00041142 S/cm was measured using the test piece.

Comparative Example 6-1

In Comparative Example 6-1, 5.021 g of the HiPco-1 dispersion liquid was mixed with 0.5 g of an acrylonitrile-butadiene-based latex (product name: CYATEX® NA-20; produced by Nippon A&L Inc.; THF-insoluble component content of acrylonitrile-butadiene rubber: 70%) to achieve a ratio of 2 parts of carbon nanotubes relative to 100 parts of polymer and the mixture was stirred for 1 hour to obtain a HiPco-1/rubber mixed solution. The resultant mixed solution was poured into a glass petri dish and was held in a dry air flow environment at 50° C. for 48 hours to evaporate moisture and obtain an applied film. Surface resistivity measured using the applied film exceeded the measurement limit.

Comparative Example 6-2

An applied film was obtained through the same operation as in Comparative Example 6-1 with the exception that the latex used in Comparative Example 6-1 was changed to other acrylonitrile-butadiene-based latex (product name: Nipol® Lx554; produced by Zeon Corporation; THF-insoluble component content of acrylonitrile-butadiene rubber: 60%). Surface resistivity measured using the applied film exceeded the measurement limit.

Comparative Example 6-3

An applied film was obtained through the same operation as in Comparative Example 6-1 with the exception that the latex used in Comparative Example 6-1 was changed to other acrylonitrile-butadiene-based latex (product name: Nipol® Lx553; produced by Zeon Corporation; THF-insoluble component content of acrylonitrile-butadiene rubber: 43%). Surface resistivity measured using the applied film exceeded the measurement limit.

Comparative Example 6-4

An applied film was obtained through the same operation as in Comparative Example 6-1 with the exception that the latex used in Comparative Example 6-1 was changed to other acrylonitrile-butadiene-based latex (product name: Nipol® Lx552; produced by Zeon Corporation; THF-insoluble component content of acrylonitrile-butadiene rubber: 27%). Surface resistivity measured using the applied film exceeded the measurement limit.

Comparative Example 6-5

An applied film was obtained through the same operation as in Comparative Example 6-1 with the exception that the latex used in Comparative Example 6-1 was changed to other acrylonitrile-butadiene-based latex (product name: Nipol® Lx551; produced by Zeon Corporation; THF-insoluble component content of acrylonitrile-butadiene rubber: 0%). Surface resistivity measured using the applied film exceeded the measurement limit.

These results demonstrate that a composite material and a conductive formed product having low resistance values can be obtained by using a dispersion liquid of carbon nanotubes that have an average diameter (Av) and a diameter distribution ($3\sigma$) satisfying a relationship $0.60 > 3\sigma/Av > 0.20$ in combination with a latex including a polymer that has a tetrahydrofuran-insoluble component content of from 1 mass % to 75 mass %.

The invention claimed is:

1. A latex composition consisting of:
    a latex including a polymer having a tetrahydrofuran-insoluble component content of at least 5 mass % and no greater than 75 mass %; and
    carbon nanotubes having an average diameter Av and a diameter distribution $3\sigma$ satisfying a relationship $0.60 > 3\sigma/Av > 0.20$, wherein
    the carbon nanotubes have a specific surface area of at least 600 m$^2$/g, and
    in a Raman spectrum of the carbon nanotubes, a ratio of G band peak intensity relative to D band peak intensity (G/D ratio) is at least 1 and no greater than 20.

2. The latex composition of claim 1, wherein
    the carbon nanotubes constitute no greater than 10 parts by mass per 100 parts by mass of the polymer.

3. The latex composition of claim 1, wherein
    the polymer is a conjugated diene rubber.

4. A latex composition production method for producing the latex composition of claim 1 comprising
    blending a dispersion liquid of carbon nanotubes having an average diameter Av and a diameter distribution $3\sigma$ satisfying a relationship $0.60 > 3\sigma/Av > 0.20$ with a latex including a polymer having a tetrahydrofuran-insoluble component content of at least 5 mass % and no greater than 75 mass %, wherein
    the carbon nanotubes have a specific surface area of at least 600 m$^2$/g, and
    in a Raman spectrum of the carbon nanotubes, a ratio of G band peak intensity relative to D band peak intensity (G/D ratio) is at least 1 and no greater than 20.

5. The latex composition production method of claim 4, further comprising preparing the dispersion liquid of the carbon nanotubes by dispersing carbon nanotubes having an average diameter Av and a diameter distribution 3σ satisfying a relationship 0.60>3σ/Av>0.20 in a solvent through dispersion treatment that brings about a cavitation effect, wherein the carbon nanotubes have a specific surface area of at least 600 m$^2$/g, and in a Raman spectrum of the carbon nanotubes, a ratio of G band peak intensity relative to D band peak intensity (G/D ratio) is at least 1 and no greater than 20.

6. The latex composition production method of claim 5, wherein the dispersion treatment is one or more dispersion treatments selected from the group consisting of dispersion treatment using ultrasound, dispersion treatment using a jet mill, and dispersion treatment using high-shear stirring.

7. A composite material obtainable using the latex composition of claim 1.

8. A conductive formed product formable by forming the composite material of claim 7.

* * * * *